(12) United States Patent
Turner et al.

(10) Patent No.: US 10,007,794 B2
(45) Date of Patent: Jun. 26, 2018

(54) METHODS AND SYSTEMS FOR ENSURING PRINTER LOOSES ABILITY TO PRINT SECURITY PATTERNS IF DISCONNECTED FROM APPROVED SYSTEM

(71) Applicant: CTPG Operating, LLC, Ithaca, NY (US)

(72) Inventors: Kyle Turner, Lake Forest, IL (US); Robert Delaney, Ithaca, NY (US); John E. Tarbotton, Ithaca, NY (US)

(73) Assignee: CTPG OPERATING, LLC, Ithaca, NY (US)

( * ) Notice: Subject to any disclaimer, the term of this patent is extended or adjusted under 35 U.S.C. 154(b) by 0 days. days.

(21) Appl. No.: 14/185,378

(22) Filed: Feb. 20, 2014

(65) Prior Publication Data
US 2015/0169884 A1    Jun. 18, 2015

Related U.S. Application Data

(60) Provisional application No. 61/916,347, filed on Dec. 16, 2013.

(51) Int. Cl.
| | | |
|---|---|---|
| *G06F 21/60* | (2013.01) | |
| *H04L 29/06* | (2006.01) | |
| *G06F 3/12* | (2006.01) | |

(52) U.S. Cl.
CPC .......... *G06F 21/608* (2013.01); *G06F 3/1222* (2013.01); *G06F 3/1238* (2013.01); *H04L 63/083* (2013.01)

(58) Field of Classification Search
CPC .... G06F 21/608; G06F 3/1222; G06F 3/1238; H04L 63/083; H04N 1/001; H04N 2201/3201

USPC ................................................ 358/1.13–1.15
See application file for complete search history.

(56) References Cited

U.S. PATENT DOCUMENTS

| | | |
|---|---|---|
| 6,362,893 B1 | 3/2002 | Francis |
| 7,667,865 B2 | 2/2010 | Ciriza |
| 8,005,936 B2 | 8/2011 | Motoyama |
| 8,316,231 B2 | 11/2012 | Aaron |

(Continued)

FOREIGN PATENT DOCUMENTS

| | | |
|---|---|---|
| GB | 2454211 | 5/2009 |
| JP | H07184068 | 7/1995 |

(Continued)

OTHER PUBLICATIONS

Fridrich, J., Goljan, M., Soukal, D., Searching for the Stego-Key, SUNY Binghamton, Dec. 30, 2013, pp. 70-82, http://proceedings/spiedigitallibrary.org.

(Continued)

*Primary Examiner* — Kent Yip
(74) *Attorney, Agent, or Firm* — Bond Schoeneck & King, PLLC; George McGuire; Jonathan Gray

(57) ABSTRACT

The present invention relates to a method and system used to ensure that a printer which is capable of printing security patterns loses its ability to print these patterns if the printer is disconnected from an approved system and, more particularly, to a method and system including a printer containing an encrypted key and password loaded into its memory, where the stored password must match a password present in a data stream sent from the host software application in order to print a requested print job.

10 Claims, 2 Drawing Sheets

(56) References Cited

U.S. PATENT DOCUMENTS

| | | |
|---|---|---|
| 8,319,990 B2 | 11/2012 | Miyazaki |
| 8,325,921 B2 | 12/2012 | Fan |
| 8,429,416 B2 | 4/2013 | Ooi |
| 8,554,090 B2 | 10/2013 | Cachia |
| 8,593,688 B2 | 11/2013 | Simske |
| 8,614,836 B2 | 12/2013 | Simske |
| 2002/0051167 A1* | 5/2002 | Francis .................. G06F 21/34 358/1.14 |
| 2002/0184519 A1 | 12/2002 | Wadley |
| 2003/0053815 A1* | 3/2003 | Testardi ................ G03G 15/50 399/79 |
| 2005/0094182 A1 | 5/2005 | Reese |
| 2010/0002249 A1 | 1/2010 | Nuggehalli |
| 2011/0026065 A1 | 2/2011 | Bard |
| 2011/0051182 A1* | 3/2011 | Sugiyama .................... 358/1.15 |
| 2012/0213369 A1 | 8/2012 | Rich |
| 2012/0219151 A1* | 8/2012 | Mano ............................. 380/51 |

FOREIGN PATENT DOCUMENTS

| | | |
|---|---|---|
| JP | 200022150 | 8/2000 |
| JP | 2003029955 | 1/2003 |

OTHER PUBLICATIONS

Sharp, T., An Implementation of Key-Based Digital Signal Steganography.

PCT International Search Report dated Mar. 31, 2015.

\* cited by examiner

METHODS AND SYSTEMS FOR ENSURING PRINTER LOOSES ABILITY TO PRINT SECURITY PATTERNS IF DISCONNECTED FROM APPROVED SYSTEM

RELATED APPLICATION

The present application claims priority to U.S. Provisional Patent Application Ser. No. 61/916,347, filed Dec. 16, 2013, the entirety of which is hereby incorporated by reference.

BACKGROUND OF THE INVENTION

1. Field of the Invention

The present invention relates to a method and system used to ensure that a printer which is capable of printing security patterns loses its ability to print these patterns if the printer is disconnected from an approved system and, more particularly, to a method and system including a printer containing an encrypted key and password loaded into its memory, where the stored password must match a password present in a data stream sent from the host software application in order to print a requested print job.

2. Description of the Related Art

Security patterns are used across a diverse marketplace to deter fraud, counterfeiting, and theft. Interpol estimates that worldwide counterfeit goods represent 5 to 7 percent of all world trade or $600 million annually. In most cases, these security patterns come pre-printed on digital print media. The digital print media must be stored in a secure location so that counterfeiters and thieves are not able to obtain the security patterns. If a counterfeiter was able to obtain the media, they would be free to print fraudulent security documents that would be very hard to detect.

There are digital printers that can print these secure patterns on demand on standard media. The advantage of these printers is that the standard media does not have to be secured and guarded against theft. Security patterns can be created on demand. However, the printer must be set up with features/methods that disable the printing of these security patterns if a thief were able to steal the printer.

Description of the Related Art Section Disclaimer: To the extent that specific patents/publications/products are discussed above in this Description of the Related Art Section or elsewhere in this Application, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY OF THE INVENTION

Various embodiments of the present invention may be advantageous in that they may solve or reduce one or more of the potential problems and/or disadvantages with conventional unsecured digital printers that can print these secure patterns on demand on standard media.

Various embodiments of the present invention may exhibit one or more of the following objects, features and/or advantages:

It is a principal object and advantage of the present invention to provide a digital printer that can print these secure patterns on demand on standard media and includes features/methods that disable the printing of these security patterns if a thief were able to steal the printer.

In accordance with the foregoing principal object and advantage, an embodiment of the present invention is directed to a digital printer including one or more of the following. First, an encrypted key is loaded into its memory that is uniquely tied to the printer serial number, where the printer will open areas of its memory where the security patterns are stored when this key is present. The security patterns or features can include, for example, pantographs, watermarks, microprinting, verification grids, validation marks, color, uv and/or IR marks, unique barcodes, serial numbers, anti-copying marks such as an Eurion mark, any combination thereof, and any other security patter as should be understood by those of skill in the art. The key can also enable upgrades to the printer by opening up an area of the printer's memory to load, as well as retrieve, security patterns. Second, the printer can have a unique password loaded into its memory. With this password in its configuration memory, the printer will be configured to look for a matching password to be present in the header of the data stream sent from the host software application (preferably running on a computer separate from the printer). If the password is not present in the data stream, the printer will not print the security patterns. A customer setting up the printer for the first time is encouraged to make this password a unique alphanumeric password. In accordance with an embodiment of the present invention, the password and the key loaded into the memory, and the password that will be present in the data stream, can be changed by a user/owner of the printer (e.g., an authorized user), This unique printer configuration has been designed to prevent unauthorized use of the printer. If a printer is stolen, the key will be present on the device, but when the thief attempts to print a security pattern; the host computer will not have the matching password in its header. Thus, the security pattern will not print. If a printer is purchased without the key and a customer attempts to print the security patterns, it will not print. They will need to purchase a license which provides them the key to load into the printer memory.

The details of one or more embodiments are described below and in the accompanying drawings. Other objects and advantages of the present invention will in part be obvious, and in part appear hereinafter.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
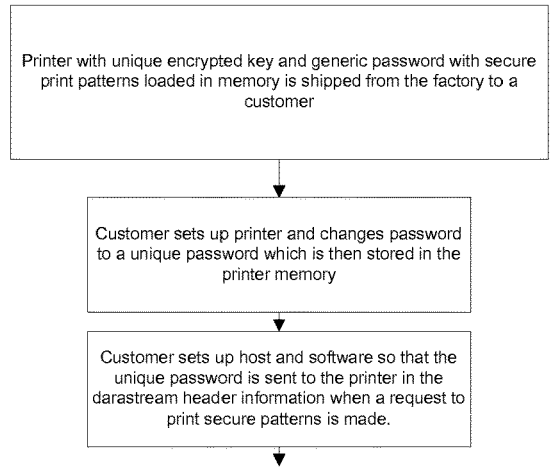
FIG. 1 is (A) a flowchart showing a method of setting the printer and host system up to ensure only authorized secure patterns are printed, and (B) a flowchart showing the decision process the printer goes through to determine if a security pattern should be printed, according to an embodiment of the present invention.
Figure 1:
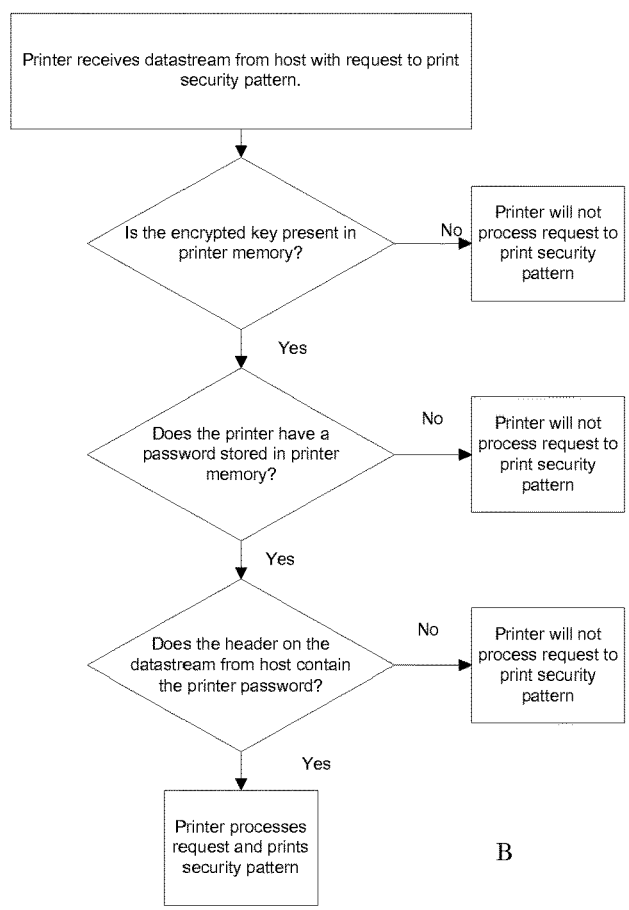

The present invention will be more fully understood and appreciated by reading the following Detailed Description in conjunction with the accompanying drawings, wherein like reference numerals refer to like components.

Turning to FIG. 1A-B, there is illustrated (A) a flowchart showing a method of setting the printer and host system up to ensure only authorized secure patterns are printed, and (B) a flowchart showing the decision process the printer goes through to determine if a security pattern should be printed, according to an embodiment of the present invention.

Figure 2:
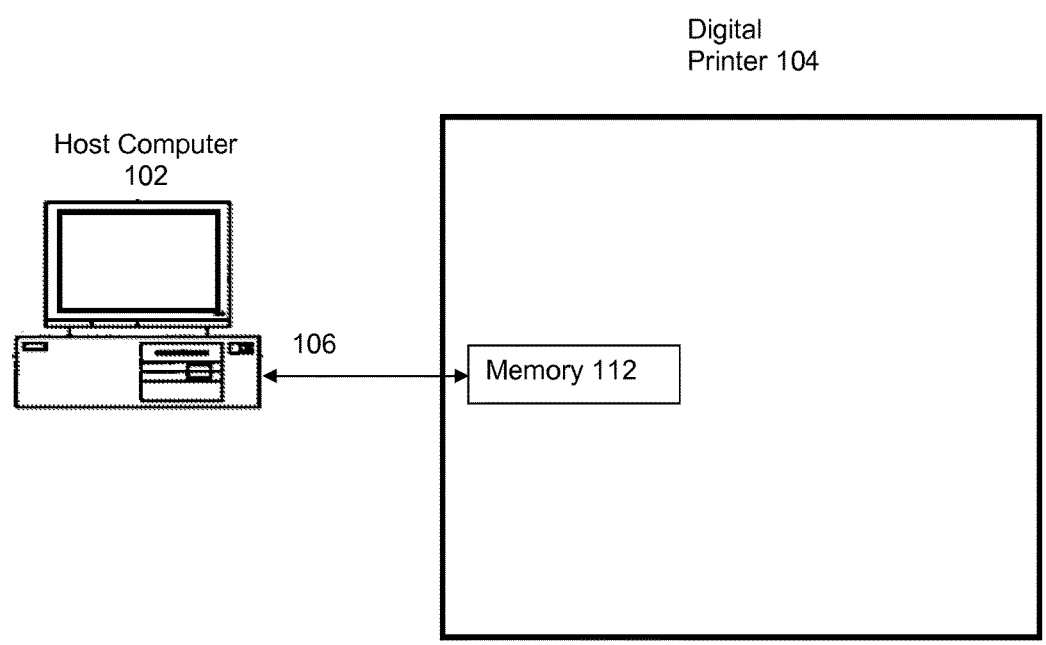
FIG. 2 is a system architecture diagram of a digital printer capable of printing security features and its connection to a host computer, according to an embodiment of the present invention.

Turning to FIG. 2, a system architecture diagram of a digital printer 104 capable of printing security features is shown. The encrypted key that can be uniquely tied to the printer's 104 serial number can be loaded into memory 112. Security patterns can also be stored in the memory 112, and the encrypted key can be configured to open areas of the memory 112 where the security patterns are stored when the encrypted key is present. A unique password can also be stored in memory 112. A host computer 102 is also shown in FIG. 2. The host computer 102 can send a matching password in the header of a data stream 106 to the printer 104, as described herein.

While the invention has been described in connection with what is presently considered to be the most practical and preferred embodiment, it is to be understood by those skilled in the art that the invention is not to be limited to the disclosed embodiment, it on the contrary, is intended to cover various modifications and equivalent arrangements included within the spirit and scope of the appended claims.

Turning to FIG. 1A-B, there is illustrated (A) a flowchart showing a method of setting the printer and host system up to ensure only authorized secure patterns are printed, and (B) a flowchart showing the decision process the printer goes through to determine if a security pattern should be printed, according to an embodiment of the present invention. Turning to FIG. 2 there is shown an embodiment of a system that may implement the flowcharts displayed in FIGS. 1A-B. As shown, the system may include a host computer 102 that is connected 106 to a digital printer 104 having a memory 112.

What is claimed is:

1. A digital printer structured or programmed to print at least a first security feature on a substrate comprising:
    a first identifier uniquely identifying the digital printer, wherein the first identifier is a serial number of the printer;
    a memory configured to store the first identifier;
    a key code loaded into said memory;
    a first password loaded into said memory; and
    a non-transitory computer-readable storage medium having program code for checking a first condition to determine whether a second password is located in a header of a data stream received by said digital printer from a host;
    wherein said non-transitory computer-readable storage medium has program code for checking a second condition to determine whether said second password matches said first password, said non-transitory computer-readable storage medium having program code for printing said first security feature on the substrate only if at least said first and second conditions are met; and
    program code for denying access to the security feature stored in memory if the key code loaded into memory does not match a predetermined key code, wherein said predetermined key code is associated with said first identifier such that the predetermined key code is unique to the digital printer.

2. The digital printer of claim 1, wherein said non-transitory computer-readable storage medium has program code for checking a third or a fourth condition to determine whether said first password is present within said memory; and wherein said non-transitory computer-readable storage medium has program code for printing said first security feature on the substrate only if said first, second, third and fourth conditions are met.

3. The digital printer of claim 1, wherein said first security feature comprises a security feature selected from the group consisting of pantographs, watermarks, microprinting, verification grids, validation marks, color, uv marks, IR marks, barcodes, anti-copying marks, and any combination thereof.

4. The digital printer of claim 3, wherein said anti-copying mark is an Eurion mark.

5. The digital printer of claim 1, wherein at least one of said key code, said first password and said second password can be changed by an authorized user of the digital printer.

6. A method of printing at least a first security feature on a substrate comprising the steps of:
    providing a digital printer structured or programmed to print at least a first security feature on a substrate comprising a first identifier, wherein the first identifier is a serial number of the printer, a memory configured to store the first identifier, a key code loaded into said memory, wherein said key code is associated with said first identifier, and a first password loaded into said memory;
    checking by a processor a first condition to determine whether a second password is located in a header of a data stream received by said digital printer from a host; and
    checking by a processor a second condition to determine whether said second password matches said first password;
    printing said first security feature on the substrate only if at least said first and second conditions are met;
    checking by a processor to determine whether the key code matches a predetermined key code; and
    denying access to the security feature stored in memory if the key code loaded into memory does not match a predetermined key code, wherein said predetermined key code is associated with said first identifier such that the predetermined key code is unique to the digital printer.

7. The method of claim 6, further comprising the steps of checking by a processor a third or a fourth condition to determine whether said first password is present within said memory; and printing said first security feature on the substrate only if said first, second, third and fourth conditions are met.

8. The method of claim 6, wherein said first identifier comprises a first serial number.

9. The method of claim 8, wherein said first security feature comprises a security feature selected from the group consisting of pantographs, watermarks, microprinting, verification grids, validation marks, color, uv marks, IR marks, barcodes, serial numbers, anti-copying marks, and any combination thereof.

10. The method of claim 6, wherein at least one of said key code, said first password and said second password can be changed by an authorized user of the digital printer.

* * * * *